Figure 1:
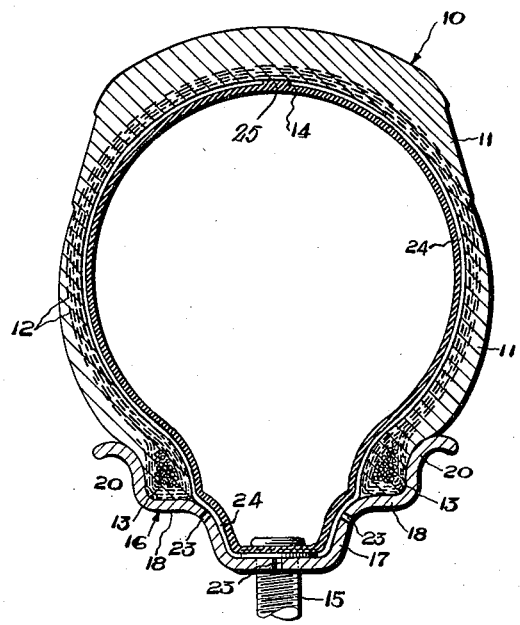

Oct. 15, 1935.  H. A. BRITTAIN  2,017,582
TUBE FOR VENTING TIRES
Filed Oct. 29, 1931  2 Sheets-Sheet 1

Inventor
Harold A. Brittain

By

Attorney

Oct. 15, 1935.  H. A. BRITTAIN  2,017,582
TUBE FOR VENTING TIRES
Filed Oct. 29, 1931  2 Sheets-Sheet 2

Inventor
Harold A Brittain
By
Attorney

Patented Oct. 15, 1935

2,017,582

UNITED STATES PATENT OFFICE 2,017,582

TUBE FOR VENTING TIRES

Harold A. Brittain, Akron, Ohio, assignor, by mesne assignments, to Wingfoot Corporation, Wilmington, Del., a corporation of Delaware Application October 29, 1931, Serial No. 571,719

13 Claims. (Cl. 152—13)

This invention relates to the venting of a unit comprised of a tire, tube and rim, and more particularly to the construction of a tube for venting the unit whereby air or other fluids contained in the unit can be vented therefrom under certain conditions.

Heretofore, it has been customary in building pneumatic tires to provide a tire, which, when mounted on a rim and inflated, is practically impervious to gases and which will not permit the escape of any fluid contained therein. Likewise, it has been customary to provide an impervious rim for this impervious tire. The inflation of the tire on the rim is usually accomplished by means of a separate inflatable inner tube disposed therein or by means of an inner tube permanently secured or formed integrally with the inner wall of the tire in a structure known as a "single tube tire".

In using this impervious tire and rim on a vehicle numerous obstacles have been encountered. For example, there is a natural seepage of the inflating fluid through the inner tube, which fluid, unless otherwise directed, will permeate the carcass of the tire and the latter being impervious does not permit the escape of this fluid. The impervious rim also prevents escape of this fluid and, as a consequnce, the fluid permeates the cords of the carcass and tends to flow along and through these cords, but as the fluid cannot escape through the relatively thick rubber sidewalls or tread portion of the tire, it forms blisters in the rubber of the sidewall and tread and frequently causes blowouts at these points. Likewise, tubes occasionally have small holes such as pin holes therein, through which the fluid may pass into the carcass and similar troubles occur.

I have discovered that, if some means is provided to permit the escape to the atmosphere of fluids which have seeped or leaked through the tube before they enter the carcass, many, if not all, of the troubles incident to the action of such fluids will be overcome. In the copending application of R. B. Day, Serial No. 561,122, filed September 4, 1931, this fluid is permitted to escape to the atmosphere by venting the tire, and in the copending application of B. Darrow, Serial No. 571,728, filed October 29, 1931, this fluid is permitted to escape from the tire or from the unit before entering the tire by means of vent passages in the rim. I propose to vent the unit by using an inner tube provided on its outer surface with one or more vent passages, which passages will conduct fluids which seep or leak through the tube, to suitable openings in the rim, including the customary opening to receive the valve stem, and thence to the atmosphere. In this manner, the fluids, or at least the greater portion of them, will be permitted to escape from the unit before they enter the carcass. I do not claim the rim per se provided with vent openings as a feature of my invention, but do claim its use in combination with my novel tube as a feature of the invention.

Accordingly, an object of my invention is to provide novel means for venting a unit comprised of a tire, tube and a rim.

A further object is to provide a novel tube for a pneumatic tire which is provided on its outer surface with corrugations or vent passages.

Other objects and advantages will become apparent from the following description.

Figure 2:
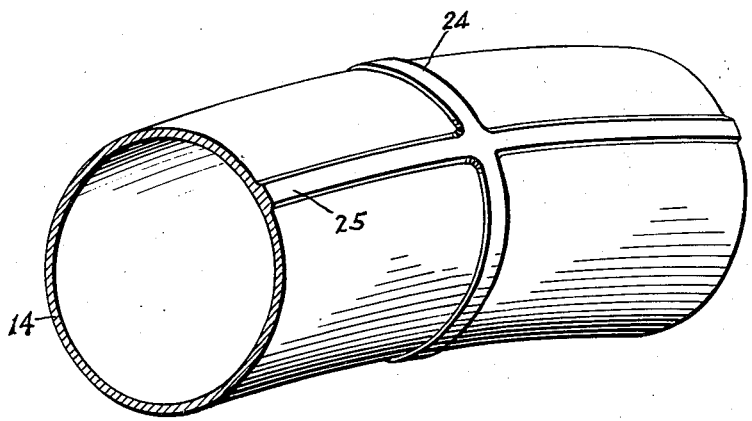
Figure 3:
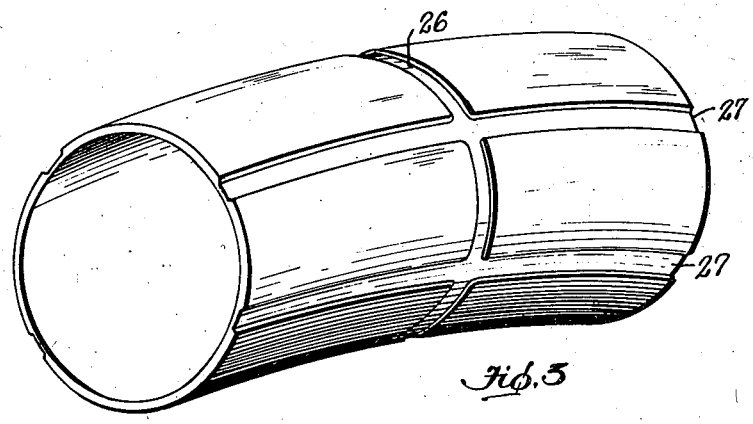
Figure 4:
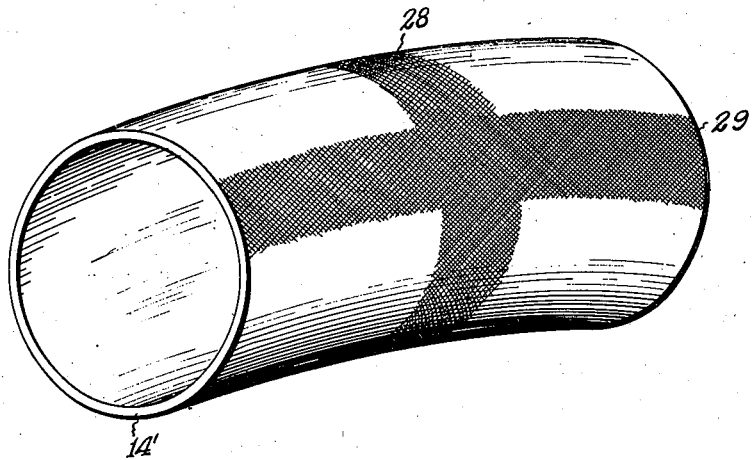

In the drawings, I have shown two embodiments of the invention. In this showing, Fig. 1 is a cross-section of a unit comprised of a tire, tube and rim provided with means for venting the unit in accordance with this invention;

Fig. 2 is a perspective view of a portion of the tube illustrated in Fig. 1; and Figs. 3 and 4 are perspective views of a portion of a tube each showing a modified form thereof.

Referring to the drawings, the numeral 10 indicates a tire as a whole, of conventional construction, comprising an outer layer of rubber compound 11 forming the tread and sidewalls of the tire, and a plurality of layers of plies 12 of rubberized cord fabric or other suitable fibrous material. These plies, at their margins, enclose bead rings 13 which preferably are composed of a plurality of relatively small wires that are at least partially embedded in rubber compound. It will be understood that the tire also may be provided with a breaker strip, chafing strips and any other portions needed to complete the structure, but these need not be referred to in order to understand the invention.

The tire 10 is provided with an inflated inner tube 14 which may be separable therefrom or which may be formed as an integral part thereof. A conventional valve 15 is carried by the inner tube to permit inflation and deflation of the latter.

The tire and tube are mounted on any suitable rim such as a drop center rim indicated as a whole by the numeral 16. This rim comprises an annular well or channel portion 17 provided in its bottom with the usual opening for receiving the valve 15, annular bead receiving shoulders 18 at the sides thereof, the shoulders 18 being formed with annular tire retaining flanges 20.

The elements described, when of conventional construction and when assembled for use on a vehicle, do not ordinarily permit the escape of fluid which seeps or leaks through the inner tube, because the tire is impervious due to the relatively thick rubber sidewalls and tread portion, the rim is impervious, except at its opening adjacent the valve stem, which opening however, ordinarily is ineffective to vent the escaping fluid unless the latter is directed to the opening, and a fluid tight connection is formed between the rim and the tire when the latter is inflated. In order to prevent blister formation in the tire and blowouts caused by leakage and seepage of fluids into the carcass, I provide one or more vent passages on the outer surface of the tube and preferably, but not necessarily, provide the rim with vent openings in addition to the customary valve stem opening, communicating with the tube passages whereby the fluids will escape to the atmosphere before they enter the carcass.

For example, in Figs. 1 and 2, I have provided a corrugated or ridged tube having one or more transverse peripheral ridges 24 on its outer surface and one circumferential peripheral ridge 25 joining with the ridges 24. Also, the rim 16 is provided with one or more vent openings 23 in the sides and bottom of the well portion 17 which are adapted to communicate with either or both of the passageways provided on each side of each of the ridges 24 and 25. In this form of the invention, fluid escaping from the tube will pass along said passageways and through the openings 23 and/or the valve stem opening to the atmosphere without entering the tire. While I prefer to provide the tube with both transverse peripheral and circumferential peripheral passages, it will be apparent that any suitable passage may be provided on the tube which will convey fluids to the openings in the rim. Furthermore, the openings in the rim need not be limited to the showing in the drawings but may be provided at any suitable point in the rim to permit communication with the grooves on the tube.

In Fig. 3 I have shown a tube having one or more transverse peripheral vent grooves or passages 26 on its outer surface and one or more circumferential peripheral grooves or passages 27 communicating with the grooves 26. In this form of the invention, fluid escaping from the tube will pass along the grooves 26 and 27 and through the openings 23 and/or the valve stem opening to the atmosphere without entering the tire.

In Fig. 4 I have shown one or more transverse peripheral knurled or roughened portions 28 and one or more similar portions 29 arranged circumferentially of the periphery of the tube 14', whereby to provide a plurality of continuous ridges and grooves and consequently passageways around the tube. Either or both of these roughened portions may be used or they may be changed as stated in connection with the possible arrangement of the passages in Fig. 1. In venting a unit having a tube constructed in accordance with the showing in Fig. 4 fluid flows along the passageways provided by the series of continuous grooves and ridges through the openings in the rim to the atmosphere.

In using the terms "transverse peripheral" and "circumferential peripheral", in order that no ambiguities will arise as to the meaning of these terms, it is to be understood that the term "transverse peripheral" refers to a passage formed substantially transversely around the tube, while the term "circumferential peripheral" refers to a passage substantially longitudinally around the tube.

It will be apparent that I have provided novel means for venting the unit referred to herein whereby fluid escaping from the tube will not enter the tire, and that I have also provided a novel tube to be used in venting such a unit.

Although I have illustrated two forms of the invention and have described those forms in detail, it will be apparent to those skilled in the art that the invention is not so limited but that various modifications may be made therein without departing from the spirit of the invention or from the scope of the appended claims.

What I claim is:

1. An inner tube for a pneumatic tire provided with one or more continuous transverse peripheral ridges on its outer surface whereby to provide a vent passageway on each side of each of said ridges.

2. An inner tube for a pneumatic tire provided on its outer surface with a continuous circumferential peripheral ridge and with one or more continuous transverse peripheral ridges joining with said circumferential ridge whereby to provide a vent passageway on each side of each of said ridges.

3. In a unit comprising an inflated tire and tube and a rim, means for venting from the unit fluids which escape from the tube, said means comprising one or more continuous transverse peripheral ridges on the outer surface of the tube whereby to provide a vent passageway on each side of of each of said ridges and one or more vent openings arranged in the rim to communicate with said passageways and the atmosphere.

4. In a unit comprising an inflated tire and tube and a rim, means for venting from the unit fluids which escape from the tube, said means comprising a continuous circumferential peripheral ridge and one or more continuous transverse peripheral ridges joining with said circumferential ridge on the outer surface of the tube whereby to provide a vent passageway on each side of each of said ridges and one or more vent openings arranged in the rim to communicate with either or all of the passageways on the tube and the atmosphere.

5. An inner tube for tire casings adapted to fill and pneumatically sustain a casing throughout the extent of its inner surface, upon being inflated to a service pressure for the casing, said inner tube being provided with minute surfaces at a substantial angle to the outer surface of the tube for defining air-venting passageways between the casing and the tube in at least the immediate region of the valve stem.

6. The combination with a tire casing having a strain-resisting carcass portion and a tread-wear portion of an inner tube adapted to fill, engage and pneumatically sustain said casing operatively completely throughout its interior, the surface of contact intermediate the tube and casing being formed with minute air-venting passageways to permit the escape of air from and between the casing and inner tube upon initial assemblage and inflation thereof past the bead portions of the casing whereby trapping of air between the inner tube and the casing is avoided and complete engagement of the inner tube and the casing for its pneumatic support is insured.

7. An inner tube for tire casings adapted to fill and pneumatically sustain a casing throughout the extent of its inner surface, upon being inflated to a service pressure for the casing, said inner tube being provided with minute ridges at a substantial angle to the outer surface of the tube for defining air-venting passageways between the casing and the tube in at least the immediate region of the valve stem.

8. An inner tube for tire casings adapted to fill and pneumatically sustain a casing throughout the extent of its inner surface, upon being inflated to a service pressure for the casing, said inner tube being provided with minute grooves at a substantial angle to the outer surface of the tube for defining air-venting passageways between the casing and the tube in at least the immediate region of the valve stem.

9. An inner tube for pneumatic tire casings having an air containing portion and an inflating valve stem, said air containing portion and stem being provided with minute means for permitting the escape of air trapped between a casing in which the tube is mounted and the tube to a point beyond the valve stem.

10. The combination with an inner tube having minute passageways for permitting the escape of air entrapped between the tube and a tire casing past the bead portions of the casing, of a valve stem air-tightly secured to the inner tube and having means for permitting the escape of air through a rim opening through which the valve stem is adapted to extend.

11. The combination with an inner tube having minute passageways for permitting the escape of air trapped between the tube and a tire casing past the bead portions of the casing, of a valve stem air-tightly secured to the inner tube and having means communicating with said passageways for permitting the escape of air through a rim opening through which the valve stem is adapted to extend.

12. An inner tube adapted to hold air under pressure above atmospheric and adapted to be nested within a tire casing of uniform construction and horseshoe form capable of resisting substantial enlargement upon inflation of the tube and having a wear or tread portion of vulcanized rubber composition, said inner tube being substantially uniform in cross section throughout its annular extent in any plane containing the axis of revolution of the tube, cross sections of the tube in planes at right angles to the axis of revolution of the tube being of circular shape, and the exterior of said inner tube being superficially shaped to define passageways between the tube and a casing within which the tube may be assembled upon at least initial inflation of the tube, such passageways being of such proportion and arrangement as not to substantially differentiate the function of said inner tube in road service within a casing from a like inner tube having a smooth exterior within an identical casing, whereby air trapped between the tube and casing during initial inflation of the tube may be vented from the tread region past the bead portions of the casing.

13. An inner tube adapted to hold air under pressure above atmospheric and adapted to be nested within a tire casing of uniform construction and horseshoe form capable of resisting substantial enlargement upon inflation of the tube and having a wear or tread portion of vulcanized rubber composition, said inner tube being substantially uniform in cross section throughout its annular extent in any plane containing the axis of revolution of the tube, cross sections of the tube in planes at right angles to the axis of revolution of the tube being of circular shape, and the exterior of said inner tube being provided with minute grooves to define passageways between the tube and a casing within which the tube may be assembled upon at least initial inflation of the tube, such passageways being of such proportion and arrangement as not to substantially differentiate the function of said inner tube in road service within a casing from a like inner tube having a smooth exterior within an identical casing whereby air trapped between the tube and casing during initial inflation of the tube may be vented from the tread region past the bead portions of the casing.

HAROLD A. BRITTAIN.